United States Patent [19]
Meeker

[11] Patent Number: 5,716,697
[45] Date of Patent: Feb. 10, 1998

[54] GLASS FIBER CONTAINING POLYMER SHEET AND PROCESS FOR PREPARING SAME

[75] Inventor: Brian L. Meeker, Maumee, Ohio

[73] Assignee: ESF Acquisition, Corp., Maumee, Ohio

[21] Appl. No.: 388,479

[22] Filed: Feb. 14, 1995

[51] Int. Cl.⁶ .................................................. B32B 17/04
[52] U.S. Cl. .......................... 428/285; 428/296; 428/297
[58] Field of Search ............................ 428/215, 287, 428/285, 296, 297, 332, 334, 335, 336, 341, 412, 435, 441, 474.7, 474.9, 476.3, 516, 517, 521

[56] References Cited

U.S. PATENT DOCUMENTS

| | | | |
|---|---|---|---|
| 3,000,772 | 9/1961 | Lunn | 428/251 |
| 3,158,668 | 11/1964 | Johnson | 264/116 |
| 3,558,423 | 1/1971 | Rossetti, Jr. | 428/251 |
| 4,596,736 | 6/1986 | Eichhorn et al. | 428/215 |
| 4,810,445 | 3/1989 | Lamb, Sr. et al. | 264/112 |
| 4,989,538 | 2/1991 | Tamura et al. | 118/313 |
| 5,108,678 | 4/1992 | Hirasaka et al. | 264/113 |
| 5,198,063 | 3/1993 | Howard | 156/282 |

*Primary Examiner*—D. S. Nakarani
*Attorney, Agent, or Firm*—Donald R. Fraser

[57] ABSTRACT

A glass fiber containing polymer sheet is prepared by providing a first polymer sheet, applying a layer of glass fibers onto the first polymer sheet, superposing over the layer of glass fibers a second polymer sheet, and laminating together the assemblage.

6 Claims, 1 Drawing Sheet

GLASS FIBER CONTAINING POLYMER SHEET AND PROCESS FOR PREPARING SAME

FIELD OF THE INVENTION

This invention relates generally to a glass fiber containing polymer sheet and a process for preparing same. More particularly, the invention is directed to a polymer sheet having glass fibers encapsulated therein, and to a process for preparing same.

BACKGROUND OF THE INVENTION

It is well-known to employ glass fibers into composite articles to strengthen and reinforce same. Glass fibers are most generally placed into a plastic or polymer matrix where the high tensile strength glass fibers cause the deformable or elastic matrix to become more rigid.

Glass fibers are often used to stabilize laminar structures. For example, a resin-impregnated glass fiber mat is often used to stiffen composite layers of a molded automotive vehicle headliner, so that it will not sag due to the effect of gravity over the life of the vehicle. Glass fibers can also be added to laminar structures by sprinkling chopped fibers onto one of the laminae, then placing the next layer thereover and laminating the assemblage together.

U.S. Pat. No. 4,989,538 to Tamura et al. discloses apparatus for sprinkling a resin composition, and a sheet material produced by said apparatus. A liquid resin composition is mixed uniformly with glass fibers sprinkled onto a polyethylene fiber. A second film of polyethylene is superposed over the resin and glass fiber mixture, and the assemblage is pressed and partially cured, to form a SMC or BMC sheet.

It would be desirable to prepare a polymer sheet material having glass fibers encapsulated therein, for use in preparing laminar composite molded articles which require the dimensional stability and stiffness afforded by such fibers.

SUMMARY OF THE INVENTION

Accordant with the present invention, there surprisingly has been discovered a process for preparing a glass fiber containing polymer sheet. The process comprises the steps of:

providing a first polymer sheet;

applying a layer of uniformly distributed, randomly oriented glass fibers onto the first polymer sheet;

superposing over the layer of glass fibers a second polymer sheet; and laminating together the first polymer sheet, layer of glass fibers and second polymer sheet, by heating same to a temperature above the plastic set temperatures of the first and second polymer sheets, and compressing the first polymer sheet, layer of glass fibers, and second polymer sheet, said first and second polymer sheets fusing together and encapsulating said glass fibers.

The invention further includes a glass fiber containing polymer sheet prepared by the inventive process.

The process and glass fiber containing polymer sheet of the present invention is particularly useful for manufacturing molded automotive vehicle headliners and other relatively rigid decorative panels.

Further objects and advantages of this invention will be apparent from the following description and appended claims, reference being made to the accompanying drawings forming a part of the specification, wherein like reference characters designate corresponding parts in the several views.

DESCRIPTION OF THE PREFERRED EMBODIMENT

Figure 1:
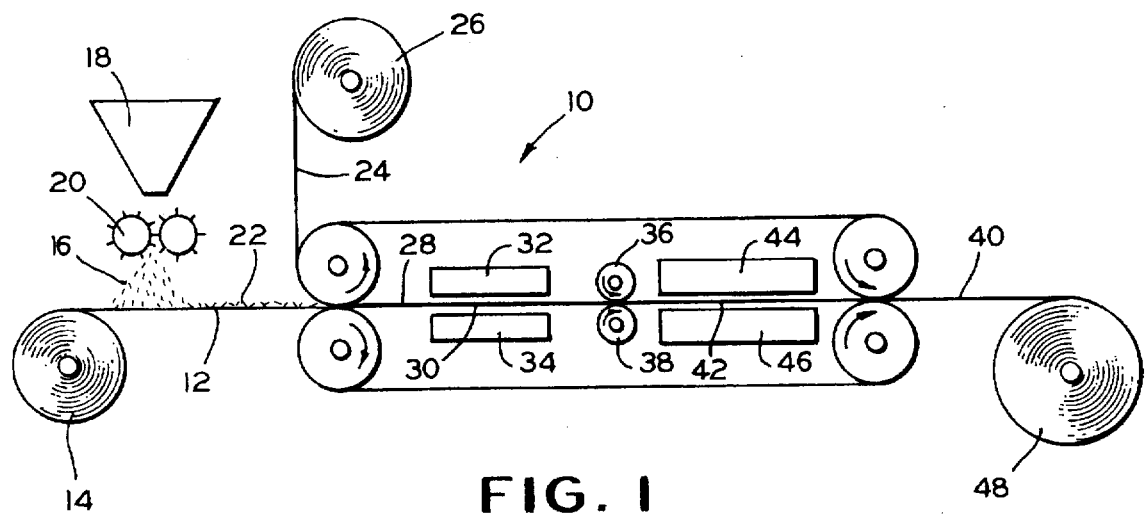
FIG. 1 is a schematic representation of a process for preparing a glass fiber containing polymer sheet, embodying the features of the present invention.

Referring now to FIG. 1, there is shown generally at 10 a schematic representation of a process for preparing a glass fiber containing polymer sheet. A first polymer sheet 12 is provided, from a first polymer sheet supply roll 14, in a horizontal plane. Glass fibers 16 from a feed hopper 18 are applied at a controlled rate to a surface of the first polymer sheet 12 using a flow and distribution device 20 such as a star valve. Alternatively, the glass fibers could be applied by feeding continuous strands of glass to a chopper which discharges to the surface of the first polymer sheet 12. The flow and distribution device 20 is operating so as to cause a layer 22 of glass fibers, having a uniform, randomly oriented distribution, to be deposited onto the first polymer sheet 12.

A second polymer sheet 24 is provided from a second polymer sheet supply roll 26 and superposed over the layer 22 of glass fibers applied to the first polymer sheet 12. The assemblage, comprising the first polymer sheet 12, the second polymer sheet 24, and the layer 22 of glass fibers therebetween, is then laminated together. In a preferred lamination process illustrated in FIG. 1, the lamination operation is accomplished by means of a belt press.

During lamination, the assemblage is compressed in an initial compression zone 28 and heated in a heating zone 30 by conventional means such as, for example, by radiant heating elements 32 and 34 positioned above and below the belts of the press. The assemblage is heated to a temperature above the plastic set temperature of the first and second polymer sheets 12 and 24. By the term plastic set temperature as it is used herein is meant that temperature below which an applied stress will not cause substantially permanent deformation to the polymer sheets 12 and 24, and above which the polymer sheets 12 and 24 are capable of being molded and fused together by virtue of the flow of the polymer of the sheets 12 and 24 around and through he filaments of the glass fibers 16 in the vicinity of the layer 22 of glass fibers.

The assemblage is further compressed, to assist in the encapsulating of the glass fibers 16 and the fusing together of the polymer sheets 12 and 24, by means of pinch rolls 36 and 38 which urge the belts of the belt press toward one another. Thus, the assemblage, comprising the first polymer sheet 12, layer 22 of glass fibers, and second polymer sheet 24, is laminated to produce the glass fiber containing polymer sheet 40 according the present invention. The glass fibers 16 are generally positioned at the fusion zone between the polymer sheets 12 and 24 in the resultant glass fiber containing polymer sheet 40.

Conveniently, the polymer sheet 40 is cooled by conveying same through a cooling zone 42, comprising conventional cooling means such as, for example, water cooled air blowers 44 and 46 positioned above and below the belts of the belt press. The cooled glass fiber containing polymer sheet 40 is then wound onto a take-up roll 48.

Figure 2:
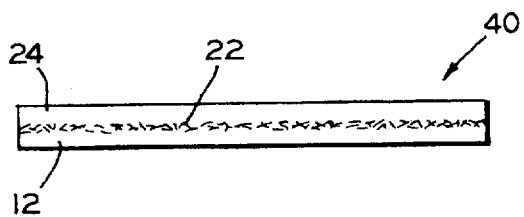
FIG. 2 is a side elevation view of a glass fiber containing polymer sheet according to the present invention.

FIG. 2 illustrates the features of the glass fiber containing polymer sheet 40, including the fused-together polymer sheets 12 and 24 and the encapsulated layer 22 of glass fibers lying generally at the fusion zone therebetween.

Figure 3:
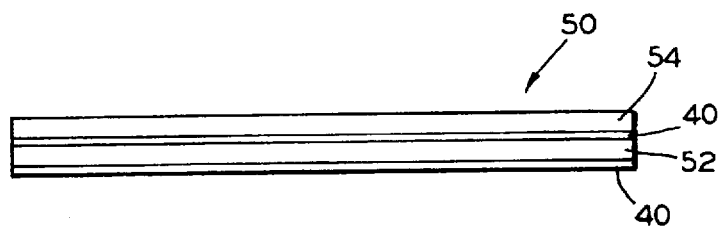
FIG. 3 is a side elevation view of a laminar structure employing the polymer sheet of FIG. 2, from which a semi-rigid decorative panel, such as an automotive vehicle headliner, may be molded.

FIG. 3 illustrates a use of the glass fiber containing polymer sheet 40 according to the present invention. A laminate 50 useful for preparing a molded decorative panel such as, for example, an automotive vehicle headliner, may be prepared by conventionally laminating together layers of glass fiber containing polymer film 40, with a sound-deadening layer of polyurethane foam 52 therebetween, and an outer decorative layer of felt 54 thereover.

Conveniently, the belt press may utilize any belt material which can be heated and cooled, yet will resist adhesion to the first and second polymer sheets. Specifically, TEFLON or TEFLON coated belts may be used. The belt press may be operated at any convenient rate which allows the application of a uniform, randomly oriented distribution of glass fibers to a thickness sufficient to impart the required strength to the ultimately produced article employing the glass fiber containing polymer sheet according to the present invention. Typically, the belt press is operated at a speed of about 3 to about 15 meters per minute.

The first and second polymer sheets according to the present invention may be produced from conventional thermoplastic materials which are well-known in the art of preparing laminated articles. Useful polymers from which the first and second polymer sheets may be produced include, but are not necessarily limited to, low density polyethylene, high density polyethylene, linear low density polyethylene, polypropylene, chlorinated polyethylene, polycarbonates, polyamides, ABS resins, polyoxyalkylenes, styrenes, and the like, are well as copolymers and blends thereof. A preferred polymer for producing the first and second polymer sheets comprises a blend of high density polyethylene and low density polyethylene. It must be noted that the first and second polymer sheets may be made of the same materials, or may comprise different polymers, depending upon the characteristics desired for the finished glass fiber containing polymer sheet. The thicknesses of the first and second polymer sheets may vary over wide limits, but generally are within a range from about 0.8 mil to about 8 mils. A preferred thickness is about 2 mils. Polymer sheets prepared from a blend of high density polyethylene and low density polyethylene are generally heated to a temperature of about 450° F. during the lamination process, in order to cause the sheets to fuse together and encapsulate the glass fibers. One ordinarily skilled in the art will readily recognize that other lamination temperatures will be required when employing polymer sheets prepared from other polymer materials.

The glass fibers are generally applied to the first polymer sheet at a rate so as to produce a glass fiber containing polymer sheet product having an average glass fiber content from about 15 grams per square meter to about 250 grams per square meter. A preferred concentration, useful for preparing a glass fiber containing polymer sheet having wide applicability, is about 70 grams per square meter. Useful glass fibers comprise bundles of filaments, each bundle containing from about 54 to about 144 ends. The glass fibers may have lengths ranging from about one-half inch to about 3 inches. A preferred glass fiber, having a weight of about 110 yards per pound and an LOI value of about 2.1%. Such glass fibers are generally "sized", i.e., coated to render them more compatible with the thermoplastics of the first and second polymer sheets.

Preparation of the glass fiber containing polymer sheet according to the present invention conveniently does not require an adhesive. The first and second polymer sheets encapsulate the layer of glass fibers, and fuse to each other as a result of their being heated above their plastic set temperatures and pressed together by the nip rolls and the belts of the press. Thus, the glass fiber containing polymer sheet comprises a convenient sheet stock, for combining with other sheet materials for preparing laminate articles. The glass fibers are encapsulated within a supple polymer sheet, and are therefore isolated so as to not irritate the hands of workers preparing laminate articles employing the inventive glass fiber containing polymer sheet.

An example of the many applications for the glass fiber containing polymer sheet is its use in an automotive vehicle headliner. Two layers of the glass fiber containing polymer sheet may be laminated or adhered to the major surfaces of a polyurethane foam board. A layer of felt or other decorative material may simultaneously or thereafter be laminated or adhered to one of the glass fiber containing polymer sheets, to form the laminated decorative panel illustrated in FIG. 3. Methods and apparatus for laminating and adhering together layers of materials to form the decorative panel of FIG. 3 are well-known. The decorative panel of FIG. 3 may subsequently be formed using conventional means such as, for example, a molding press, to prepare a three-dimensional, molded vehicle headliner. Such a headliner is relatively inflexible and will retain its molded shape over time due to the incorporation into the headliner of the glass fibers provided by the glass fiber containing polymer sheets of the present invention.

While certain representative embodiments and details have been shown for the purpose of illustrating the present invention, it will be apparent to those skilled in the art that various changes in applications can be made therein, and that the invention may be practiced otherwise than as specifically illustrated and described without departing from its spirit and scope.

What is claimed is:

1. A glass fiber containing polymer sheet, comprising:

first and second polymer sheets, said first and second polymer sheets being different, said first and second polymer sheets being fused together to form a fusion zone generally therebetween; and a layer of glass fibers encapsulated substantially within the fusion zone.

2. A glass fiber containing polymer sheet according to claim 1 wherein said layer of glass fibers consists of chopped fibers of glass.

3. A glass fiber containing polymer sheet, comprising:

first and second polymer sheets, said polymer sheets being fused together to form a fusion zone generally therebetween; and a layer of glass fibers, said glass fibers comprising bundles of filaments, each said bundle containing from about 54 to about 114 ends, said glass fibers being encapsulated substantially within the fusion zone.

4. A glass fiber containing polymer sheet, comprising:

first and second polymer sheets, said polymer sheets being fused together to form a fusion zone generally therebetween; and a layer of glass fibers, the lengths of the glass fibers ranging from about one-half inch to about 3 inches, said glass fibers being encapsulated substantially within the fusion zone.

5. A glass fiber containing polymer sheet, comprising:

first and second polymer sheets, said polymer sheets being fused together to form a fusion zone generally therebetween; and a layer of glass fibers encapsulated substantially within the fusion zone, the glass fiber content of said glass fiber containing polymer sheet ranging from about 15 to about 250 grams per square meter.

6. A glass fiber containing polymer sheet, comprising:

first and second polymer sheets, said polymer sheets being fused together to form a fusion zone generally therebetween; and a layer of glass fibers encapsulated substantially within the fusion zone, the glass fiber content of said glass fiber containing polymer sheet being about 70 grams per square meter.

* * * * *